United States Patent
Schneider et al.

(10) Patent No.: US 11,095,138 B2
(45) Date of Patent: Aug. 17, 2021

(54) MULTI-BAY BATTERY CHARGER

(71) Applicant: Milwaukee Electric Tool Corporation, Brookfield, WI (US)

(72) Inventors: Scott Schneider, Waukesha, WI (US); James S. Hull, Burlington, WI (US); Jay Rosenbecker, Menomonee Falls, WI (US); Cole A. Conrad, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1046 days.

(21) Appl. No.: 14/378,455

(22) PCT Filed: Feb. 18, 2013

(86) PCT No.: PCT/US2013/026590
§ 371 (c)(1),
(2) Date: Aug. 13, 2014

(87) PCT Pub. No.: WO2013/123480
PCT Pub. Date: Aug. 22, 2013

(65) Prior Publication Data
US 2015/0008879 A1    Jan. 8, 2015

Related U.S. Application Data

(60) Provisional application No. 61/600,217, filed on Feb. 17, 2012.

(51) Int. Cl.
*H02J 7/00*    (2006.01)
*B60L 3/00*    (2019.01)
(Continued)

(52) U.S. Cl.
CPC ............ *H02J 7/0045* (2013.01); *B60L 3/003* (2013.01); *B60L 3/0046* (2013.01); *B60L 50/20* (2019.02);
(Continued)

(58) Field of Classification Search
CPC ...................................................... H02J 7/0042
See application file for complete search history.

(56) References Cited

U.S. PATENT DOCUMENTS 3,507,501 A * 4/1970 Lear ........................ H05K 11/02
                                                          360/132
4,154,384 A    5/1979 Carver
(Continued)

FOREIGN PATENT DOCUMENTS

| GB | 2421370 | 6/2006 | |
|---|---|---|---|
| WO | WO 2011061811 | * 5/2011 | ............ B60W 10/26 |
| WO | 2013/123480 | 8/2013 | |

OTHER PUBLICATIONS

Sony Battery Charger BC-L160 operations manual Sep. 2008.*
(Continued)

*Primary Examiner* — Drew A Dunn
*Assistant Examiner* — Tynese V McDaniel
(74) *Attorney, Agent, or Firm* — Michael Best & Friedrich LLP (57) ABSTRACT

A battery charger includes a housing and a plurality of charging ports coupled to the housing. Each charging port is configured to connect a battery pack to the battery charger. The battery charger also includes a charging circuit positioned within the housing and electrically coupled to the plurality of charging ports. The charging circuit is operable to charge the battery packs connected to the plurality of charging ports in series. The battery charger further includes a skip switch coupled to the charging circuit. The skip switch
(Continued)

is operable to skip a battery pack currently being charged and advance to another battery pack connected to the battery charger.

9 Claims, 9 Drawing Sheets (51) Int. Cl.
*B60L 50/20* (2019.01)
*B60L 53/30* (2019.01)
*B60L 58/26* (2019.01)
*B60L 53/80* (2019.01)

(52) U.S. Cl.
CPC ............ *B60L 53/305* (2019.02); *B60L 53/80* (2019.02); *B60L 58/26* (2019.02); *H02J 7/00* (2013.01); *H02J 7/0024* (2013.01); *B60L 2200/12* (2013.01); *B60L 2240/36* (2013.01); *B60L 2240/527* (2013.01); *H02J 7/0027* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(56) References Cited

U.S. PATENT DOCUMENTS

| | | | |
|---|---|---|---|
| 5,157,318 A | 10/1992 | Wang | |
| 5,357,187 A | 10/1994 | Park | |
| 5,357,624 A * | 10/1994 | Lavan | G06F 12/0684 365/63 |
| 5,477,123 A * | 12/1995 | Allen | G06F 1/1616 307/48 |
| 5,539,297 A | 7/1996 | Fiebig | |
| 5,621,301 A | 4/1997 | Allen et al. | |
| 5,652,499 A | 7/1997 | Morita et al. | |
| 5,757,163 A | 5/1998 | Brotto et al. | |
| 6,018,227 A * | 1/2000 | Kumar | H01M 10/4257 320/106 |
| 6,157,316 A * | 12/2000 | Okayama | G08B 5/227 320/162 |
| 6,184,655 B1 * | 2/2001 | Malackowski | H02J 7/0026 320/116 |
| 6,204,632 B1 | 3/2001 | Nierescher et al. | |
| 6,268,711 B1 | 7/2001 | Bearfield | |
| 6,281,661 B2 | 8/2001 | Kaite et al. | |
| 6,522,101 B2 | 2/2003 | Malackowski | |
| 6,593,723 B1 | 7/2003 | Johnson | |
| 6,650,089 B1 | 11/2003 | Freeman et al. | |
| 6,710,577 B1 * | 3/2004 | Shum | H01M 10/441 320/112 |
| 6,803,745 B2 | 10/2004 | Nishida et al. | |
| 6,818,860 B1 * | 11/2004 | Stava | B23K 9/1006 219/130.1 |
| 6,822,423 B2 | 11/2004 | Yau et al. | |
| 7,045,989 B2 | 5/2006 | Sakakibara et al. | |
| 7,365,514 B2 | 4/2008 | Tong | |
| 7,638,970 B1 | 12/2009 | Gebhard et al. | |
| 7,782,011 B2 | 8/2010 | Nishida et al. | |
| 7,843,165 B2 | 11/2010 | Sakaue et al. | |
| 7,843,167 B2 | 11/2010 | DeRome et al. | |
| 7,855,528 B2 | 12/2010 | Lee | |
| 7,855,530 B2 | 12/2010 | Coonan et al. | |
| 7,956,579 B2 | 6/2011 | Dishman et al. | |
| 2005/0001593 A1 | 1/2005 | Kawasumi et al. | |
| 2005/0057225 A1 * | 3/2005 | Marquet | H02J 7/0054 320/138 |
| 2005/0264261 A1 * | 12/2005 | Barbeau | F21L 2/00 320/114 |
| 2005/0275372 A1 * | 12/2005 | Crowell | H02J 7/0018 320/112 |
| 2006/0113956 A1 * | 6/2006 | Bublitz | H02J 7/0013 320/112 |
| 2007/0210747 A1 * | 9/2007 | Brandon, II | H02J 7/0003 320/114 |
| 2007/0285049 A1 * | 12/2007 | Krieger | H01M 2/1055 320/105 |
| 2008/0200221 A1 | 8/2008 | Lockwood | |
| 2008/0265836 A1 * | 10/2008 | Inoue | H02J 7/0003 320/110 |
| 2009/0295328 A1 * | 12/2009 | Griffin, Jr. | H02J 7/0027 320/115 |
| 2010/0060232 A1 * | 3/2010 | Boyles | H02J 7/0027 320/107 |
| 2010/0237832 A1 | 9/2010 | Mack | |
| 2011/0006729 A1 | 1/2011 | Matthias et al. | |
| 2011/0101912 A1 | 5/2011 | Goto et al. | |
| 2011/0121783 A1 | 5/2011 | Boyles et al. | |
| 2011/0210704 A1 | 9/2011 | Baker | |
| 2012/0299533 A1 * | 11/2012 | Huffman | H02J 7/0013 320/107 |
| 2013/0035813 A1 * | 2/2013 | Kusumi | B60K 6/46 701/22 |
| 2013/0050926 A1 * | 2/2013 | Zhou | G06F 1/186 361/679.32 |

OTHER PUBLICATIONS

Sony, "Battery charger BC-L160 Operation manual," 1st Edition, 2008. Retrieved from the Internet: http://www.videodata.de/shop/media/products/Sony_BC-160.pdf.
European Patent Office Supplementary Search Report for Application No. 13749093.4 dated Sep. 10, 2015 (7 pages).
European Supplementary Search Report for Application No. 13749093.4 dated Jan. 22, 2016 (16 pages).
International Preliminary Report on Patentability for Application No. PCT/US2013/026590 dated Aug. 28, 2014 (8 pages).
European Patent Office Action for Application No. 13749093.4, dated May 9, 2019, 9 pages.
European Patent Office Third Party Observation for Application No. 13749093.4 dated Jul. 6, 2018, 3 pages.
European Patent Office Action for Application No. 13749093.4 dated Jul. 18, 2018, 9 pages.

* cited by examiner

MULTI-BAY BATTERY CHARGER

CROSS-REFERENCE TO RELATED APPLICATIONS

This application is a national phase filing under 35 U.S.C. 371 of International Application No. PCT/US2013/026590 filed Feb. 18, 2013, which claims priority to U.S. Provisional Patent Application No. 61/600,217, filed Feb. 17, 2012 and titled "MULTI-BAY BATTERY CHARGER," the entire contents of which are incorporated by reference herein.

BACKGROUND

The present invention relates to battery chargers and, more particularly, to multi-bay battery chargers for supporting and charging more than one battery.

Multi-bay battery chargers can charge battery packs in series (i.e., one at a time) or in parallel (i.e., simultaneously). When a multi-bay charger charges battery packs in series, the battery pack currently being charged typically finishes charging before the next battery begins charging. In addition, multi-bay battery chargers are usually large and cumbersome to carry.

SUMMARY

In one embodiment, the invention provides a battery charger including a housing and a plurality of charging ports coupled to the housing. Each charging port is configured to connect a battery pack to the battery charger. The battery charger also includes a charging circuit positioned within the housing and electrically coupled to the plurality of charging ports. The charging circuit is operable to charge the battery packs connected to the plurality of charging ports in series. The battery charger further includes a skip switch coupled to the charging circuit. The skip switch is operable to skip a battery pack currently being charged and advance to another battery pack connected to the battery charger.

In another embodiment, the invention provides a method of charging battery packs in series. The method includes connecting a first battery pack and a second battery pack to a battery charger, charging the first battery pack, actuating a skip switch on the battery charger while the first battery pack is charging, and stopping charging of the first battery pack and initiating charging of the second battery pack in response to actuating the skip switch.

In yet another embodiment, the invention provides a battery charger including a housing having a handle to facilitate lifting and carrying the battery charger and a plurality of charging ports coupled to the housing. Each charging port is configured to connect a battery pack to the battery charger. The battery charger also includes a charging circuit positioned within the housing and electrically coupled to the plurality of charging ports. The charging circuit is operable to charge the battery packs connected to the plurality of charging ports. The plurality of charging ports is spaced apart on the housing such that, when a battery pack is connected to each charging port, the battery charger is balanced around the handle.

In still another embodiment, the invention provides a battery charger including a housing and a plurality of charging ports coupled to the housing. Each charging port is configured to connect a battery pack to the battery charger. The battery charger also includes a charging circuit having a first circuit board and a second circuit board. The first and second circuit boards are mounted in parallel within the housing. The charging circuit is electrically coupled to the plurality of charging ports to charge the battery packs connected to the plurality of charging ports.

In yet still another embodiment, the invention provides a battery charger including a housing having four side surfaces arranged in a generally rectangular pattern, an upper surface extending between and arranged generally perpendicular to the four side surfaces, and a handle extending from the upper surface to facilitate lifting and carrying the battery charger. The battery charger also includes a plurality of charging ports coupled to the housing. Each charging port is configured to connect a battery pack to the battery charger. The plurality of charging ports is spaced apart on the housing such that, when a battery pack is connected to each charging port, the battery charger is balanced around the handle. The battery charger further includes a charging circuit having a first circuit board and a second circuit board. The first and second circuit boards are mounted in parallel within the housing. The charging circuit is electrically coupled to the plurality of charging ports to charge the battery packs connected to the plurality of charging ports in series. The battery charger also includes a skip switch coupled to the charging circuit. The skip switch is operable to skip a battery pack currently being charged and advance to another battery pack connected to the battery charger.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 6:
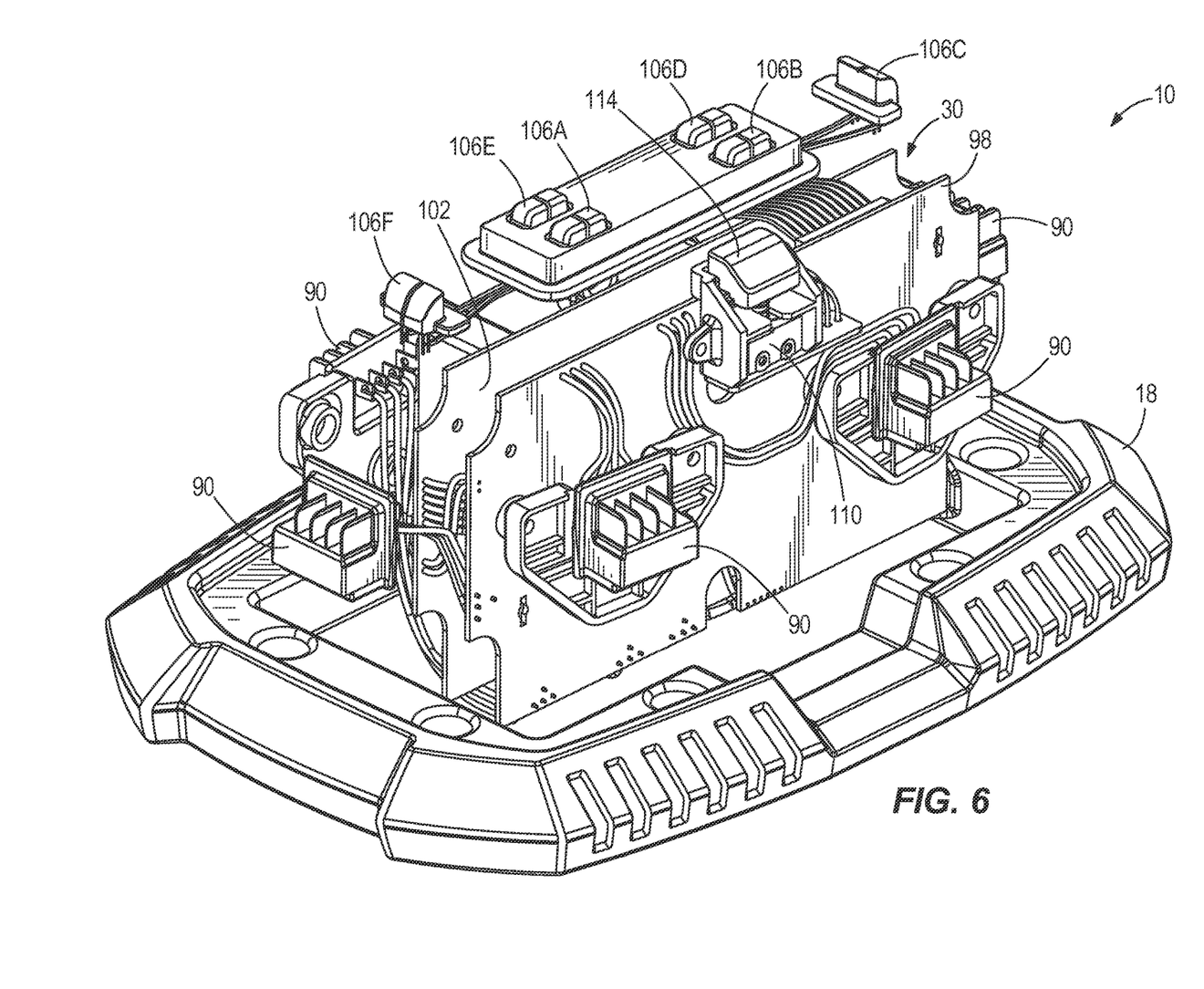
FIG. 6 is a perspective view of the multi-bay battery charger with a housing removed to show interior components of the charger.
Figure 7:
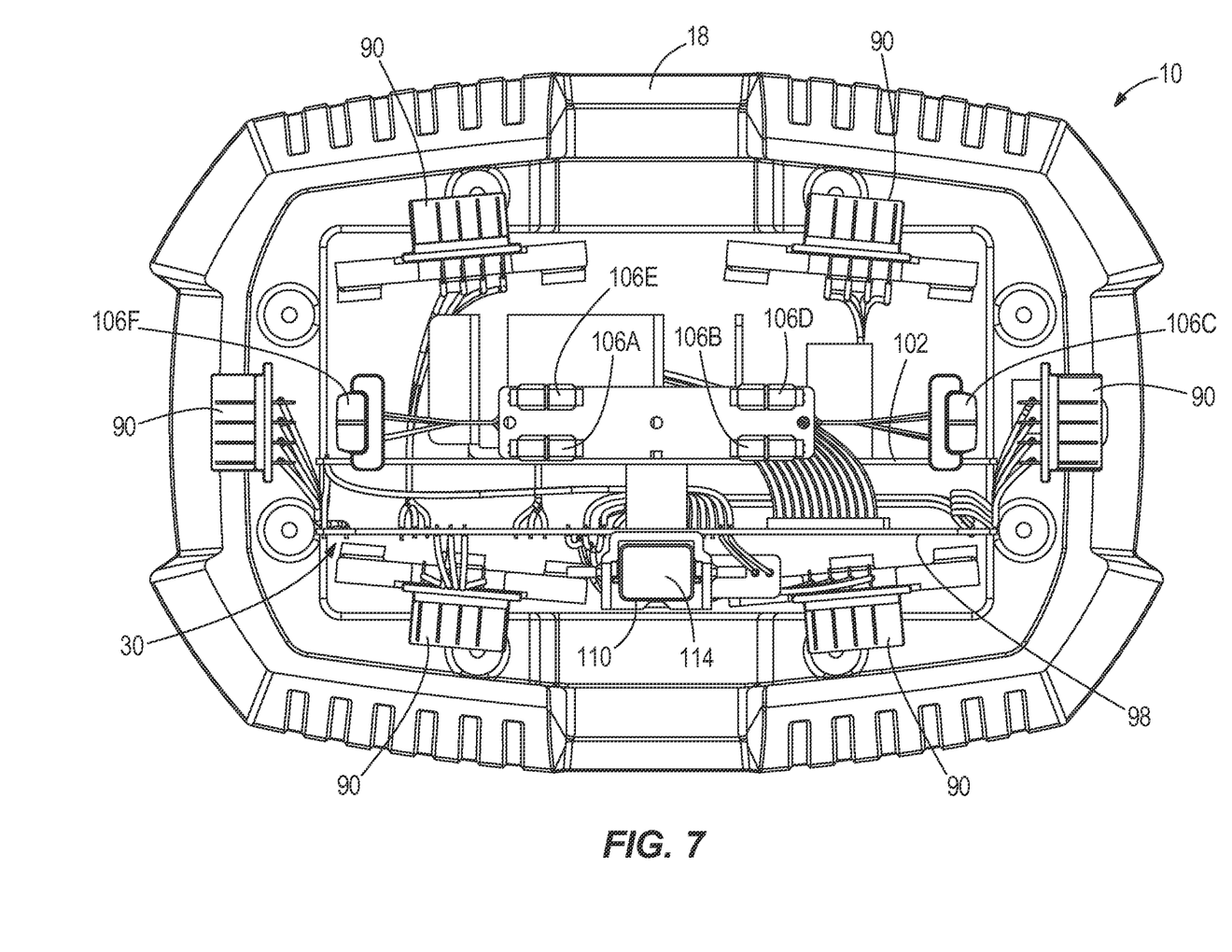
FIG. 7 is a top view of the multi-bay battery charger with the housing removed.
Figure 8:
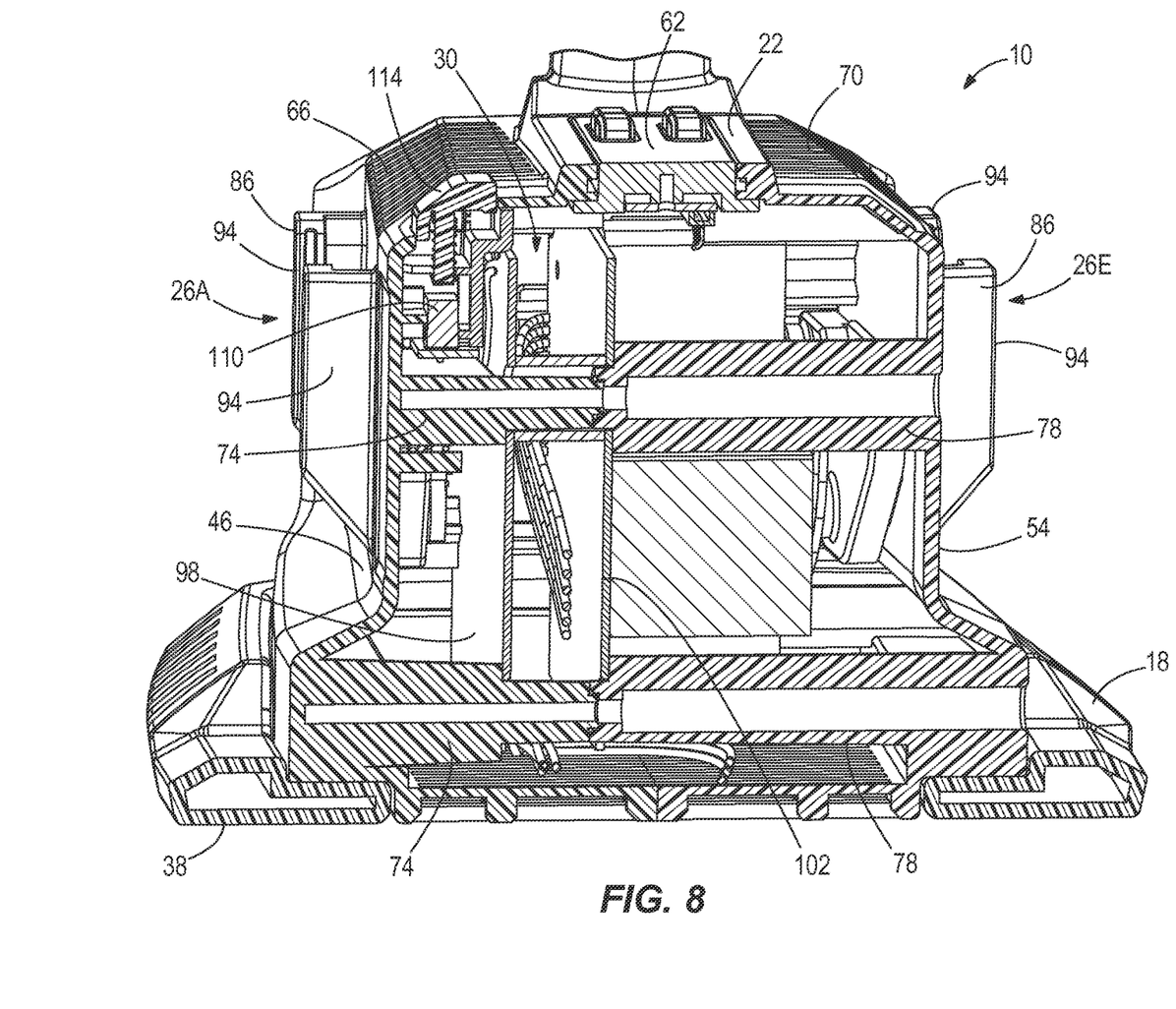
FIG. 8 is a cross-sectional view of the multi-bay battery charger.

FIGS. 1-5 illustrate a multi-bay battery charger 10 that is configured to support and charge multiple battery packs 14A-F. In the illustrated embodiment, the battery charger 10 supports and charges up to six battery packs 14A-F. In other embodiments, the battery charger 10 is configured to support and charger fewer or more battery packs 14A-F. The battery packs 14A-F are, for example, 18-volt Li-ion power tool battery packs. In other embodiments, the battery packs 14A-F may have different voltages (e.g., 8-volt, 12-volt, 16-volt, 28-volt, 48-volt, etc.) and/or different chemistries (e.g., NiMH, NiCd, etc.). The illustrated charger 10 includes a base 18, a housing 22, six charging ports 26A-F (FIG. 5), and a charging circuit 30 (FIGS. 6-8).

Figure 2:
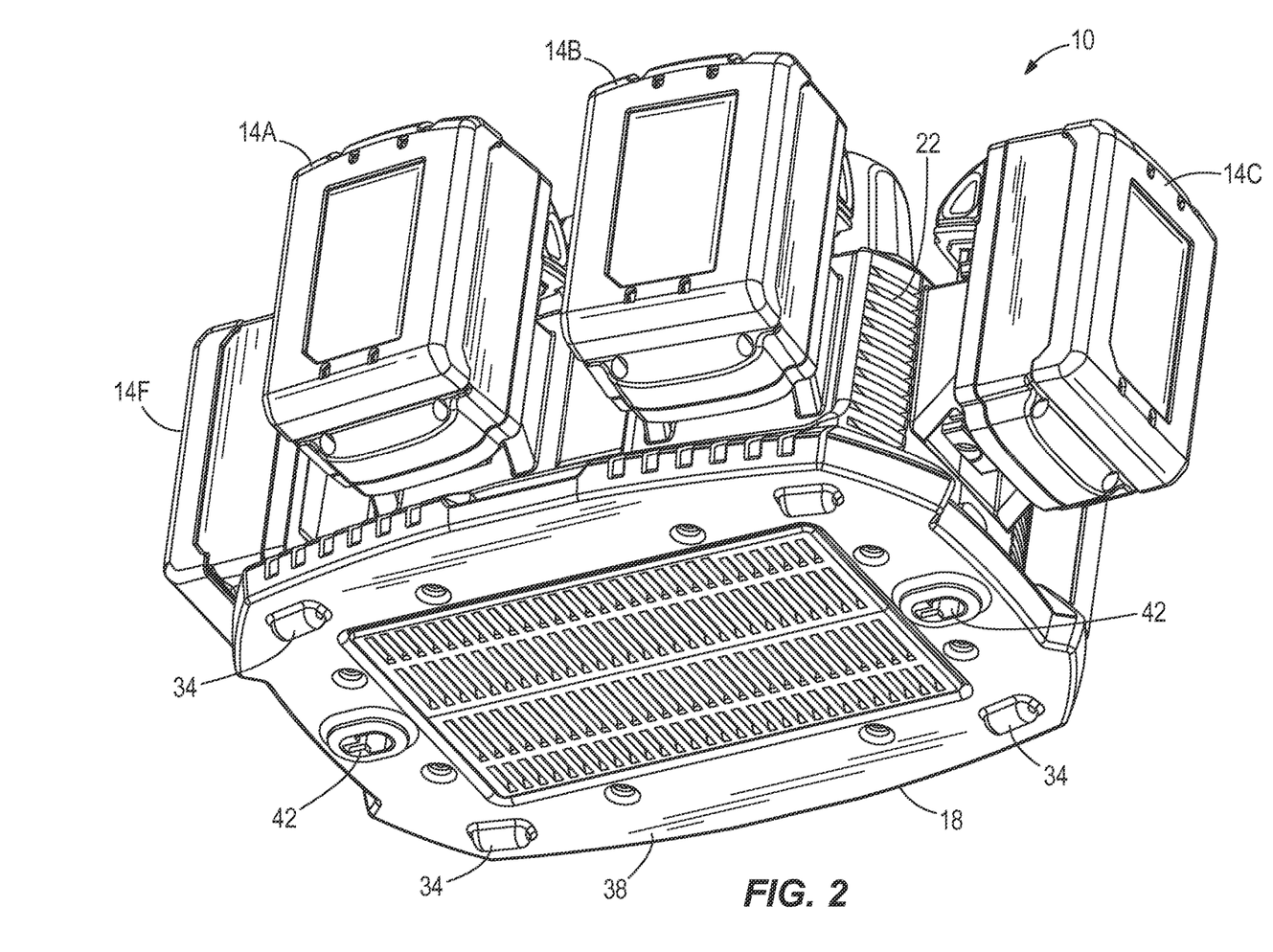
FIG. 2 is a bottom perspective view of the multi-bay battery charger supporting the battery packs.

The base 18 is coupled to a bottom portion of the housing 22. The base 18 is generally larger (e.g., wider and longer) than the housing 22 to add stability to the charger 10. As shown in FIG. 2, feet 34 extend from a bottom surface 38 of the base 18. The feet 34 space the bottom surface 38 of the base 18 and the housing 22 apart from a surface (e.g., a table, a counter, the floor, etc.) that supports the charger 10 to facilitate cooling interior components (e.g., the charging circuit 30) of the charger 10. The base 18 also includes two receptacles 42 on the bottom surface 38. The receptacles 42 are configured to receive screws, or other fasteners, to mount the charger 10 to a wall or other vertical surface. The receptacles 42 also extend from the bottom surface 38 of the base 18 to function as additional feet.

The housing 22 extends outwardly from the base 18 and includes four side surfaces 46, 50, 54, 58 and an upper surface 62. The side surfaces 46, 50, 54, 58 are arranged perpendicular to one another in a generally rectangular pattern. The upper surface 62 is spaced apart from the base 18 and extends generally perpendicular to the side surfaces 46, 50, 54, 58. As shown in FIG. 8, the housing 22 is composed of two clamshell halves 66, 70 that connect together to define the surfaces 46, 50, 54, 58, 62 of the housing 22. The clamshell halves 66, 70 thereby enclose the interior components of the charger 10. In the illustrated embodiment, the clamshell halves 66, 70 are aligned and secured together by bosses 74, 78 and screws (not shown). In other embodiments, the housing 22 may be formed as a single piece that is connected to the base 18.

Figure 3:
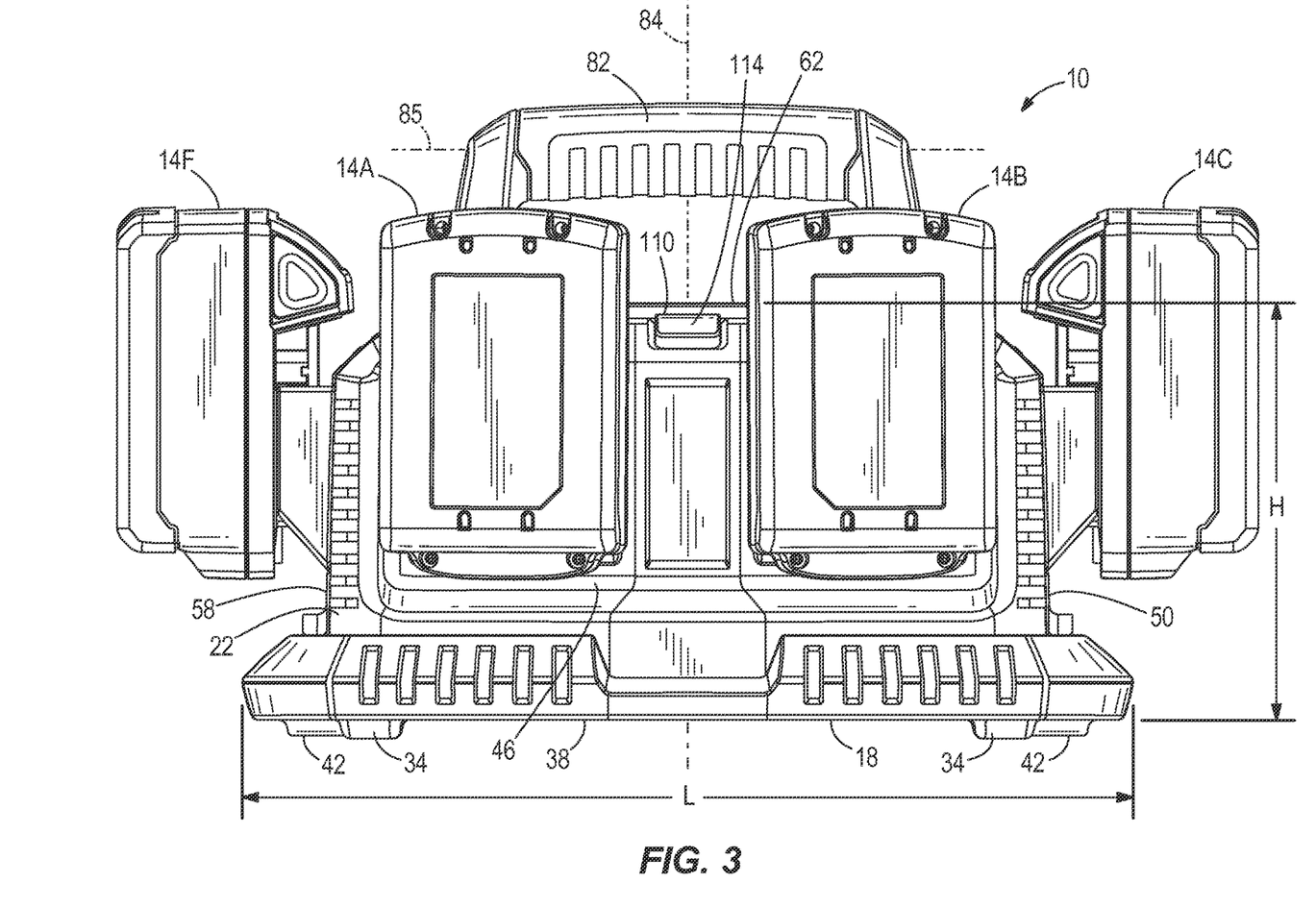
FIG. 3 is a side view of the multi-bay battery charger supporting the battery packs.
Figure 4:
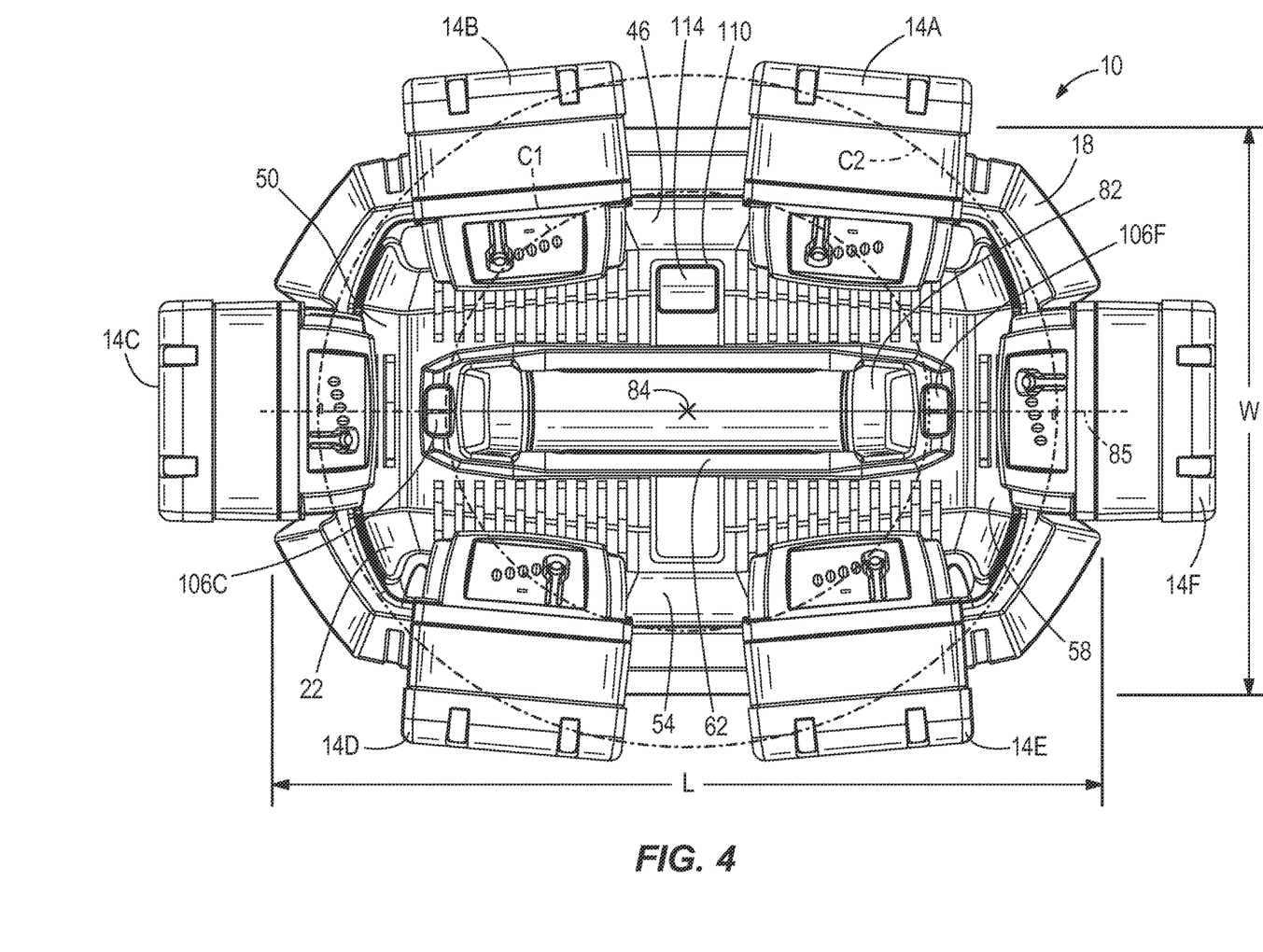
FIG. 4 is a top view of the multi-bay battery charger supporting the battery packs.

Referring to FIGS. 3 and 4, the illustrated charger 10 has a length L, a width W, and height H defined by the base 18 and the housing 22. The length L is measured between edges of the base 18 adjacent the side surfaces 50, 58. The width W is measured between edges of the base 18 adjacent the side surfaces 46, 54. The height H is measured between the bottom surface 38 of the base 18 and the upper surface 62 of the housing 22. A ratio of the length L, to the width W, to the height H of the battery charger 10 is about 2:1.4:1. In the illustrated embodiment, the length L is about 11 inches, the width W is about 7.7 inches, and the height H is about 5.4 inches. As such, the charger 10 is relatively compact and has a total volume of less than 460 cubic inches. Furthermore, a footprint area of the charger 10, which is the amount of surface area taken up by the charger 10 when the charger 10 is positioned on a table or wall (measured by the length L times the width W), is less than 85 square inches.

Referring back to FIG. 5, the side surfaces 46, 50, 54, 58 are generally vertically oriented when the charger 10 is supported by the base 18 on a table. Each side surface 46, 50, 54, 58 supports at least one of the charging ports 26A-F. In the illustrated embodiment, two of the side surfaces (e.g., the front and rear side surfaces 46, 54) each support two charging ports 26A-B, 26D-E, while the other side surfaces 50, 58 each support one charging port 26C, 26F. In other embodiments, the charger 10 may include a total of four charging ports and each of the side surfaces 46, 50, 54, 58 may only support one charging port. In still other embodiments, the charger 10 may include eight or more charging ports and each of the side surfaces 46, 50, 54, 58 may support two or more charging ports.

In the illustrated embodiment, the housing 22 also includes a handle 82 extending from the upper surface 62. As shown in FIGS. 3 and 4, the handle 82 is centrally positioned on the charger 10 such that a central axis 84 defined by the side surfaces 46, 50, 54, 58 of the housing 22 extends through the handle 82. The illustrated handle 82 defines a longitudinal axis 85 that is generally parallel to the side surfaces 46, 54 and is generally perpendicular to the side surfaces 50, 58. The handle 82 thereby defines an elongated grip that is generally parallel to and spaced apart from the upper surface 62 to facilitate lifting and carrying the charger 10.

The charging ports 26A-F are spaced apart around the handle 82 to help balance the charger 10 around the handle 82. That is, the handle 82 is positioned on the charger 10 so that the weight of the battery packs 14A-F, when connected to the charging ports 26A-F, is balanced around the handle 82. Referring to FIG. 4, the charging ports 26A, 26B, 26D, 26E on the side surfaces 46, 54 define a first circle C1 that generally extends through a midpoint of each port 26A, 26B, 26D, 26E. Similarly, the charging ports 26C, 26F on the side surfaces 50, 58 define a second circle C2 that generally extends through a midpoint of each port 26C, 26F. Both circles C1, C2 have their origin at the central axis 84. Each of the charging ports 26A-F is diametrically opposed from another charging port 26A-F around its respective circle C1, C2. For example, the first charging port 26A is diametrically opposed from the fourth charging port 26D around the first circle C1, the second charging port 26B is diametrically opposed from the fifth charging port 26E around the first circle C1, and the third charging port 26C is diametrically opposed from the sixth charging port 26F around the second circle C2. As such, each of the battery packs 14A-F, when connected to the charger 10, is located opposite another battery pack 14A-F to balance the weights of the packs 14A-F around the handle 82. Such an arrangement facilitates lifting and carrying the charger 10 by the handle 82.

Figure 5:
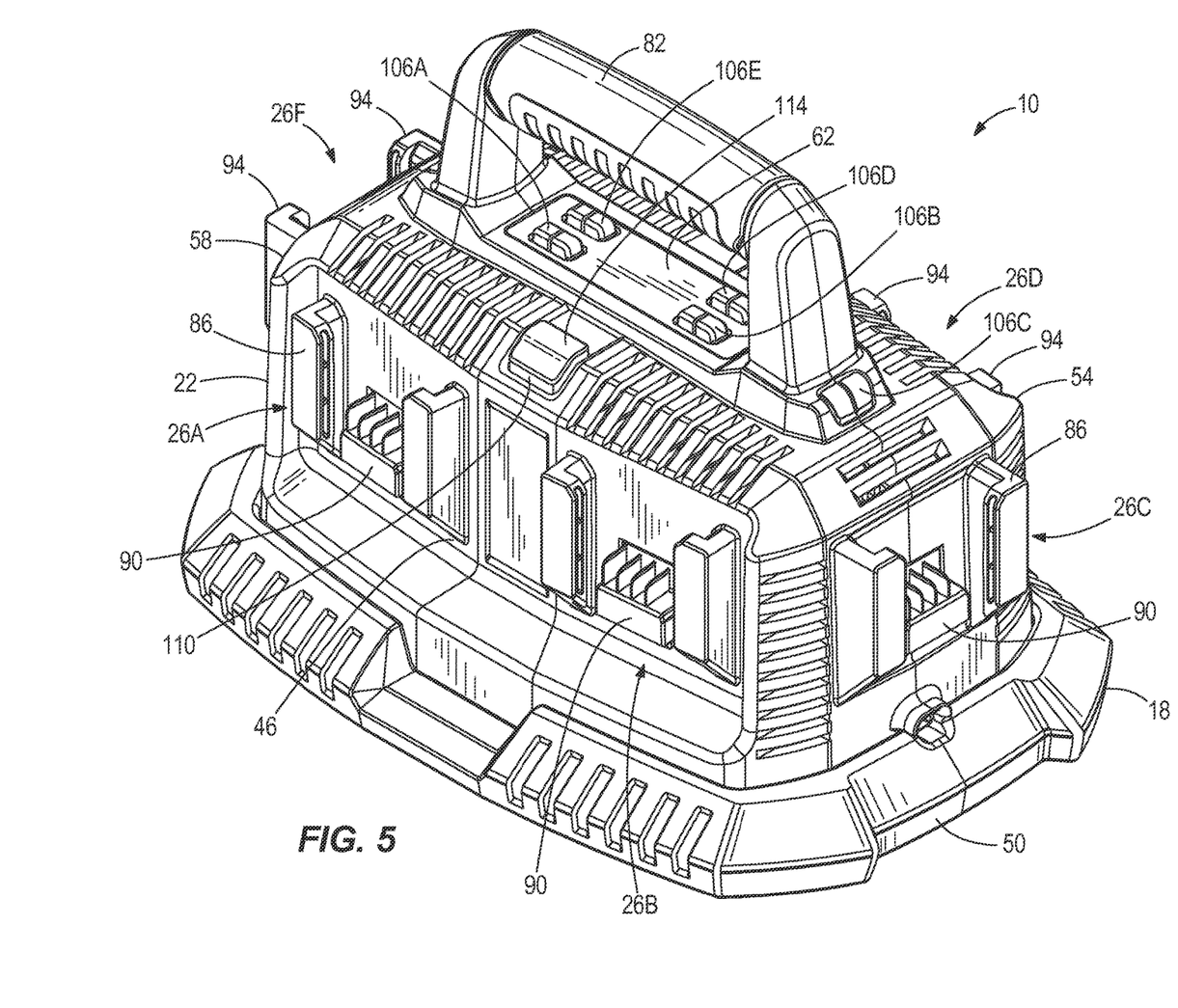
FIG. 5 is a top perspective view of the multi-bay battery charger without the battery packs.

As shown in FIG. 5, each of the charging ports 26A-F includes a connecting structure 86 and electrical contacts 90. In the illustrated embodiment, the connecting structures 86 include guide rails 94 configured to receive slide-on style battery packs. The guide rails 94 are arranged generally parallel to the central axis 84 of the housing 22 to support the battery packs 14A-F generally vertically when the charger 10 is positioned on a table. The guide rails 94 also inhibit the packs 14A-F from sliding off of the charger 10 when the charger 10 is carried by the handle 82. In particular, the guide rails 94 are arranged such that the battery packs 14A-F are slid downward (e.g., toward the base 18) to connect the packs 14A-F to the charging ports 26A-F. In other embodiments, the connecting structures 86 may be configured to receive different styles of battery packs, such as tower style battery packs.

As shown in FIGS. 6-8, the electrical contacts 90 of the charging ports 26A-F are coupled to the charging circuit 30. The charging circuit 30 is positioned within the housing 22 and charges the battery packs 14A-F when the packs 14A-F are connected to the charging ports 26A-F. The illustrated charging circuit 30 includes two circuit boards 98, 102 that are mounted in parallel within the housing 22. The circuit boards 98, 102 are generally the same shape and size. The charging circuit 30 is split onto the two circuit boards 98, 102 to reduce the overall size of the battery charger 10. In the illustrated embodiment, the circuit boards 98, 102 are arranged generally vertically within the housing 22 such that the boards 98, 102 extend between the side surfaces 50, 58, but face the side surfaces 46, 54 of the housing 22. Furthermore, the circuit boards 98, 102 are arranged generally perpendicular to the upper surface 62 of the housing 22 and the bottom surface 38 of the base 18. This arrangement of the circuit boards 98, 102 helps reduce the size, and particularly the footprint area, of the charger 10. In other embodiments, the charging circuit 30 may be split onto three or more circuit boards and/or the circuit boards 98, 102 may be arranged horizontally within the housing 22.

Figure 1:
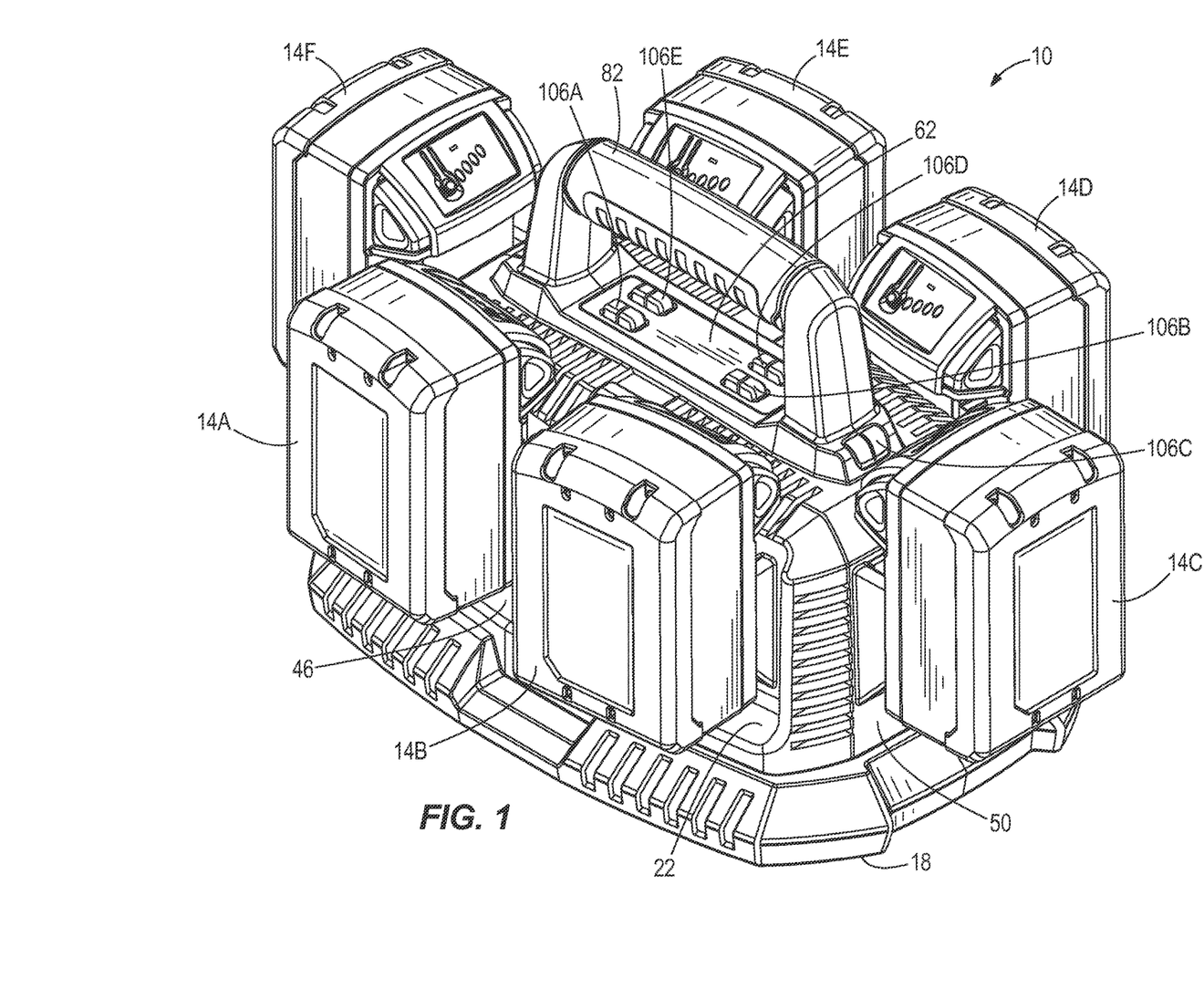
FIG. 1 is a top perspective view of a multi-bay battery charger embodying the invention, the charger supporting six battery packs.

In the illustrated embodiment, the battery charger also includes six sets of indicator lights 106A-F coupled to the charging circuit 30. The illustrated indicator lights 106A-F are light-emitting diodes (LEDs). As shown in FIGS. 1 and 5, the LEDs 106A-F extend from the upper surface 62 of the housing 22. Each set of LEDs 106A-F corresponds to one of the charging ports 26A-F to indicate an operational status. For example, a continuous red light indicates the battery pack is charging, a continuous green light indicates charging is complete, and flashing red and green lights indicate an error. In addition, if a battery pack is connected to a charging port while another battery pack is already being charged, one of the LEDs (e.g., a red LED) may flash to indicate that charging is pending and will begin when the other battery pack is finished charging.

The LEDs 106A-B, 106D-E corresponding to the four charging ports 26A-B, 26D-E on the front and rear side surfaces 46, 54 of the housing 22 are supported on the housing 22 beneath the handle 82. That is, the LEDs 106A-B, 106D-E are generally covered by the handle 82 when the charger 10 is viewed from above (as in FIG. 4). The LEDs 106C, 106F corresponding to the two charging ports 26C, 26F on the other side surfaces 50, 58 of the housing 22 are contoured to match the shape of the transition areas between the handle 82 and the upper surface 62 so that the LEDs 106C, 106F are generally flush with the housing 22. Such positioning and configurations help protect the LEDs 106A-F from impacts and other forces, reducing the possibility of shearing or otherwise damaging the LEDs 106A-F.

In operation, the battery charger 10 charges the battery packs 14A-F in series such that one battery pack 14A-F is charged at a time. The charging circuit 30 cycles serially through the charging ports 26A-F to determine parameters regarding the battery packs 14A-F that are connected to each port 26A-F. These parameters include the presence of a battery pack and which, if any, of the battery packs requires charging. If more than one battery pack that requires charging is connected to the charger 10, the charging circuit 30 will sequentially charge the battery packs in order from the battery pack connected to the lowest charging port (e.g., the first charging port 26A) to the battery pack connected to the highest charging port (e.g., the sixth charging port 26F). When the charging circuit 30 is finished charging the battery pack connected to a particular charging port, the charging circuit 30 will move on to charge the battery pack connected to the next charging port, and so on. If a battery pack is not connected to one of the battery ports, or if the battery pack and/or charging port is experiencing an error, the charging circuit 30 will skip that particular port and move on to the next sequential charging port.

As shown in FIGS. 3-7, the battery charger 10 further includes a skip switch 110 coupled to the charging circuit 30. The illustrated skip switch 110 extends from the upper surface 62 of the housing 22 adjacent the front side surface 46. In other embodiments, the skip switch 110 may be positioned in another location on the charger 10 that is accessible to a user. The skip switch 110 includes a manual actuator 114 that allows a user to skip the battery pack currently being charged and advance to the next battery pack in line. That is, the skip switch 110 allows the user to select which battery pack 14A-F is currently being charged to charge the battery packs 14A-F out of order. In the illustrated embodiment, the manual actuator 114 is a depressible button. In other embodiments, the manual actuator 114 may be a slidable switch or a rotatable knob or dial. In operation, a user manually moves (e.g., depresses, rotates, etc.) the skip switch 110 relative to the housing 22 to control and select which battery pack 14A-F is currently being charged.

For example, rather than charging the battery packs 14A-F sequentially based on the order of the charging ports 26A-F, the user may depress the actuator 114 to stop charging the battery pack currently being charged and begin charging the next battery pack in line. Such action allows the user to interrupt charging of the battery pack currently being charged before charging is complete. The user may depress the actuator 114 multiple times to skip multiple charging ports until the desired charging port and battery pack is reached. As discussed above, the LEDs 106A-F indicate to the user which battery pack is currently being charged and which battery packs still need charging to facilitate operating the skip switch 110.

Figure 9:
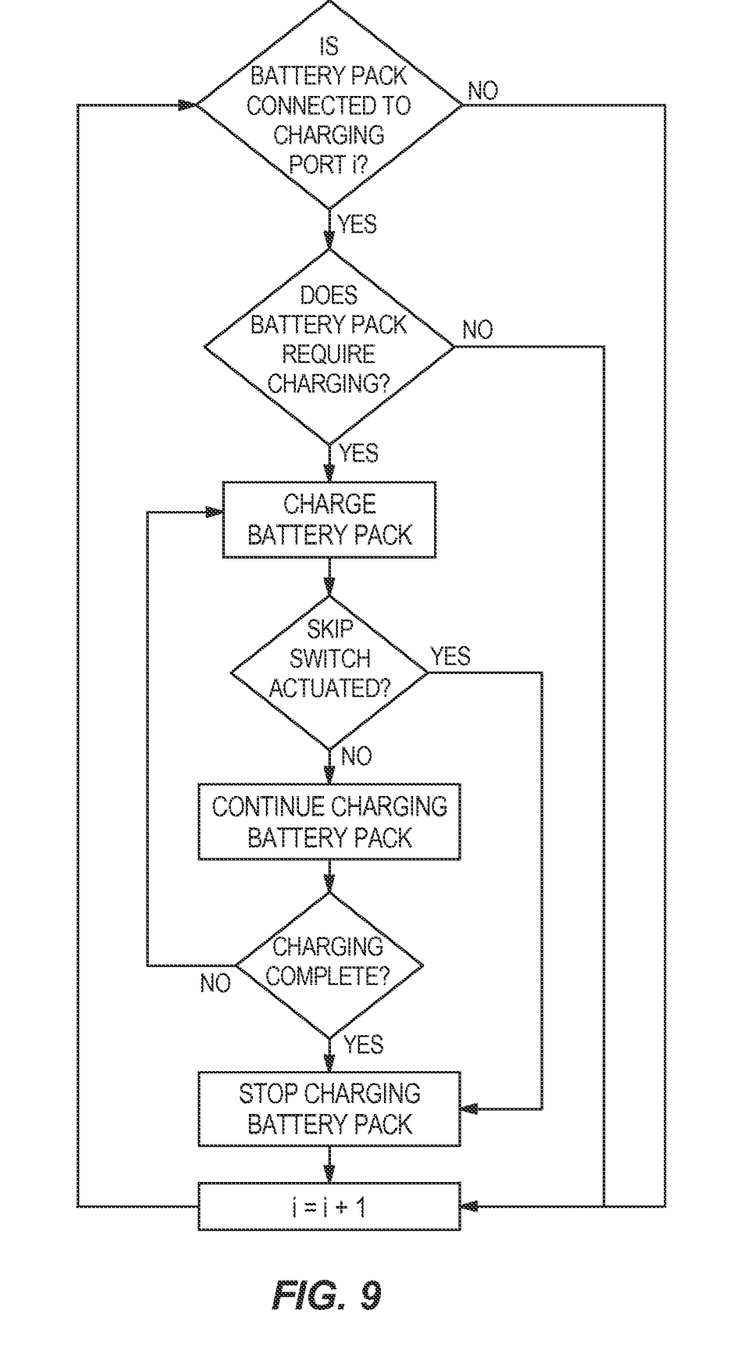
FIG. 9 is a flowchart depicting operation of the multi-bay battery charger.

FIG. 9 is a flowchart that depicts operation of the battery charger 10 with the skip switch 110. The charging circuit 30 includes a processor and memory to perform the steps outlined in the flowchart. Generally, the charging circuit 30 checks if a battery pack is connected to a particular charging port and requires charging. If both of these criteria are 'yes,' the charging circuit 30 charges the battery pack until charging is complete. Once charging is complete, the charging circuit 30 stops charging the battery pack and increments a counter. The charging circuit 30 then checks if a battery pack is connected to the charging port associated with the incremented value of the counter (e.g., the next charging port in line) and if the battery pack requires charging. If, however, the skip switch 110 is actuated while the battery pack is charging (or at any other time), charging of the battery pack is stopped and the counter is incremented. The charging circuit 30 then moves on to check if a battery pack is connected to the charging port associated with the current value of the counter and if that battery pack requires charging. In the illustrated embodiment, the counter increments between 1 and 6 (corresponding to the six charging ports 26A-F) before automatically resetting back to 1. In other embodiments, the counter may increment to a smaller or greater value depending on the number of charging ports on the charger 10.

In other embodiments, the battery charger 10 includes respective inputs associated with each of the charging ports 26A-F. For example, a single button or switch may be associated with each charging port 26A-F. In such embodiments, the charger 10 charges the battery pack connected to the port 26A-F with the button or switch that is currently actuated. If a user wishes to charge a particular battery pack connected to a particular charging port, the user actuates the button or switch associated with that port, and the battery charger 10 proceeds to charge that battery pack, irrespective of which other pack is currently being charged. If, on the other hand, a user does not depress one of the buttons or switches, the battery charger 10 charges the battery packs in order.

The configurations, shapes, and sizes of the battery packs 14A-F for use with the charger 10 described above include but are not limited to the configurations, shapes, and sizes of battery packs that are attachable to and detachable from electrical devices such as power tools, test and measurement equipment, vacuum cleaners, outdoor power equipment, and vehicles. Power tools include, for example, drills, circular saws, jigsaws, band saws, reciprocating saws, screw drivers, angle grinders, straight grinders, hammers, impact wrenches, angle drills, inspection cameras, and the like. Test and measurement equipment includes digital multimeters, clamp meters, fork meters, wall scanners, IR temperature guns, and the like. Vacuum cleaners include stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like. Vehicles include, for example, automobiles, motorcycles, scooters, bicycles, and the like.

Although the invention has been described with reference to certain preferred embodiments, variations and modifications exist within the scope and spirit of one or more independent aspects of the invention. Various features and advantages of the invention are set forth in the following claims.

The invention claimed is:

1. A battery charger comprising:
   a housing including an upper surface and a handle to facilitate lifting and carrying the battery charger, the handle extending from and positioned above the upper surface;
   a plurality of charging ports coupled to the housing, each charging port configured to connect a battery pack to the battery charger;
   a charging circuit positioned within the housing and electrically coupled to the plurality of charging ports, the charging circuit operable to charge the battery packs connected to the plurality of charging ports; and
   an indicator light coupled to the charging circuit and associated with one of the plurality of charging ports, the indicator light being supported on the upper surface beneath the handle and within a footprint defined by a perimeter of the handle;
   wherein the plurality of charging ports is spaced apart on the housing such that, when a battery pack is connected to each charging port, the battery charger is balanced around the handle;
   wherein the housing includes four side surfaces arranged in a generally rectangular pattern, and wherein at least one charging port is positioned on each side surface;
   wherein the plurality of charging ports includes six charging ports, wherein two of the four side surfaces each support two charging ports, and wherein two of the four side surfaces each support one charging port.

2. The battery charger of claim 1, wherein the housing defines a central axis that extends through the handle.

3. The battery charger of claim 2, wherein every charging port coupled to the housing is diametrically opposed from another charging port around a circle whose origin is the central axis.

4. The battery charger of claim 2, wherein each charging port includes guide rails, and wherein the guide rails extend generally parallel to the central axis to receive slide-on style battery packs.

5. The battery charger of claim 1, wherein the handle defines a longitudinal axis that is generally parallel to two of the four side surfaces and is generally perpendicular to two of the four side surfaces.

6. A battery charger comprising:
   a base;
   a housing including a bottom portion coupled to the base, and an upper surface spaced apart from the base;
   a plurality of charging ports coupled to the housing, each charging port configured to connect a battery pack to the battery charger; and
   a charging circuit including a first circuit board and a second circuit board, the first and second circuit boards being mounted in parallel within the housing and being oriented such that a face of each of the first and second circuit boards is generally perpendicular to the upper surface, the charging circuit being electrically coupled to the plurality of charging ports to charge the battery packs connected to the plurality of charging ports.

7. The battery charger of claim 6, wherein the housing includes four side surfaces arranged in a generally rectangular pattern, and wherein the first and second circuit boards extend between two opposing sides surfaces of the four side surfaces and face the other two opposing side surfaces of the four side surfaces.

8. The battery charger of claim 6, wherein the first and second circuit boards are generally the same shape and size.

9. The battery charger of claim 6, wherein a footprint area of the battery charger is less than 85 square inches.

\* \* \* \* \*